United States Patent
Nigam et al.

(10) Patent No.: US 9,717,040 B2
(45) Date of Patent: Jul. 25, 2017

(54) METHOD AND SYSTEM FOR ENHANCED CELL ACQUISITION IN COMMUNICATION SYSTEM

(71) Applicant: Samsung Electronics Co., Ltd., Gyeonggi-do (KR)

(72) Inventors: Anshuman Nigam, Bangalore (IN); Anil Agiwal, Bangalore (IN); Diwakar Sharma, Bangalore (IN)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 145 days.

(21) Appl. No.: 14/572,566

(22) Filed: Dec. 16, 2014

(65) Prior Publication Data
US 2015/0173004 A1 Jun. 18, 2015

(30) Foreign Application Priority Data

Dec. 16, 2013 (IN) ............................ 5862/CHE/2013
Aug. 28, 2014 (IN) ............................ 5862/CHE/2013

(51) Int. Cl.
*H04W 4/00* (2009.01)
*H04W 48/16* (2009.01)
(Continued)

(52) U.S. Cl.
CPC ......... *H04W 48/16* (2013.01); *H04J 11/0076* (2013.01); *H04J 11/0086* (2013.01); *H04W 56/001* (2013.01)

(58) Field of Classification Search
CPC . H04W 36/00; H04W 36/0061; H04W 48/16; H04W 56/001; H04J 11/0076; H04J 11/0086
(Continued)

(56) References Cited

U.S. PATENT DOCUMENTS 6,104,930 A * 8/2000 Ward .................... H04W 16/28
455/450
8,009,661 B2  8/2011 Lindoff et al.
(Continued)

FOREIGN PATENT DOCUMENTS

| KR | 20090112679 A | 10/2009 |
| KR | 20100033905 A | 3/2010 |
| KR | 20120130296 A | 11/2012 |

OTHER PUBLICATIONS

International Search Report dated Feb. 24, 2015 in connection with International Application No. PCT/KR2014/012405; 3 pages.
(Continued)

*Primary Examiner* — Farah Faroul

(57) ABSTRACT

A method of enabling cell acquisition in a wireless communication includes determining, by a first base station, a Mobile Station (MS) located at a granularity of a first frequency carrier cell sector level, identifying at least one second base station within the first frequency carrier cell sector level, transmitting a second frequency carrier cell search command to the MS and identifying, by the MS, the second frequency carrier cell based on one or more parameters defined in the search command. The first frequency carrier cell enables the MS to search for the second frequency carrier cell by providing a predefined number of synchronization slots to be monitored based on the location information of the MS.

25 Claims, 16 Drawing Sheets

(51) Int. Cl.
*H04W 56/00* (2009.01)
*H04J 11/00* (2006.01)

(58) Field of Classification Search
USPC .......................................................... 370/329
See application file for complete search history.

(56) References Cited

U.S. PATENT DOCUMENTS

| | | | |
|---|---|---|---|
| 2002/0187784 A1* | 12/2002 | Tigerstedt | H04W 36/0088 455/439 |
| 2008/0181194 A1 | 7/2008 | Lindoff et al. | |
| 2008/0298336 A1* | 12/2008 | Gollamudi | H04B 7/022 370/343 |
| 2009/0232098 A1* | 9/2009 | Makabe | H04W 36/0083 370/332 |
| 2010/0304741 A1* | 12/2010 | Gogic | H04W 48/16 455/434 |
| 2010/0330984 A1* | 12/2010 | Lee | H04W 48/16 455/424 |
| 2012/0033646 A1 | 2/2012 | Luo et al. | |
| 2013/0039268 A1 | 2/2013 | Blankenship et al. | |
| 2013/0295928 A1* | 11/2013 | Suzuki | H04W 48/16 455/434 |
| 2014/0057624 A1* | 2/2014 | Murgan | H04B 1/7087 455/422.1 |
| 2015/0003271 A1* | 1/2015 | Park | H04L 27/2613 370/252 |
| 2015/0146679 A1* | 5/2015 | Lindoff | H04B 1/7103 370/330 |
| 2015/0148039 A1* | 5/2015 | Yang | H04W 36/0083 455/436 |
| 2015/0189666 A1* | 7/2015 | Wang | H04W 72/1226 370/329 |
| 2016/0057708 A1* | 2/2016 | Siomina | H04W 52/243 455/452.2 |
| 2016/0088579 A1* | 3/2016 | Harada | H04W 48/10 370/336 |
| 2016/0164726 A1* | 6/2016 | Fraser | H04W 28/26 370/254 |

OTHER PUBLICATIONS

Written Opinion of International Searching Authority dated Feb. 24, 2015 in connection with International Application No. PCT/KR2014/012405; 5 pages.

* cited by examiner

METHOD AND SYSTEM FOR ENHANCED CELL ACQUISITION IN COMMUNICATION SYSTEM

CROSS-REFERENCE TO RELATED APPLICATION(S) AND CLAIM OF PRIORITY

The present application is related to and claims the benefit under 35 U.S.C. §119(a) of Indian Patent Application No. 5862/CHE/2013 filed on Dec. 16, 2013 and Indian Patent Application No. 5862/CHE/2013 filed Aug. 28, 2014, in the Indian Patent Office, the entire disclosures of which are hereby incorporated by reference.

TECHNICAL FIELD

The present disclosure generally relates to the field of wireless communication and more particularly relates to a method and system for searching a cell in an asymmetric heterogeneous deployment in LTE Networks.

BACKGROUND

In the recent years, several broadband wireless technologies have been developed to meet growing number of broadband subscribers and to provide more and better applications and services. The 3rd Generation Partnership Project 2 (3GPP2) has developed Code Division Multiple Access 2000 (CDMA 2000), 1× Evolution Data Optimized (1×EVDO) and Ultra Mobile Broadband (UMB) systems. The 3rd Generation Partnership Project (3GPP) has developed Wideband Code Division Multiple Access (WCDMA), High Speed Packet Access (HSPA) and Long Term Evolution (LTE) systems. The Institute of Electrical and Electronics Engineers (IEEE) has developed Mobile Worldwide Interoperability for Microwave Access (WiMAX) systems. As more and more people become users of mobile communication systems, and more and more services are provided over these systems, exponential increase in need of mobile communication system with large capacity, high throughput, lower latency and better reliability is observed.

Super Mobile Broadband (SMB) system based on millimeter waves (mmWave) i.e. radio waves with wavelength in range of 1 millimeter (mm) to 10 mm, which corresponds to a radio frequency of 30 Gigahertz (GHz) to 300 GHz, is a candidate for next generation mobile communication technology, as vast amount of spectrum is available in mmWave band. A SMB network as introduced in paper titled "An introduction to Millimeter-Wave Broadband Systems" authored by Zhouyue Pi and Farooq Khan consists of multiple SMB base stations (BSs) that cover a geographic area. In order to ensure good coverage, SMB base stations need to be deployed with higher density than macro-cellular base stations. In general, roughly the same site-to-site distance as microcell or Pico-cell deployment in an urban environment is recommended. The transmission and/or reception in an SMB system are based on narrow beams, which suppress the interference from neighboring SMB base stations and extend the range of SMB link. However, due to high path loss, heavy shadowing and rain attenuation reliable transmission at higher frequencies is one of the key issues that need to be overcome in order to make the millimeter wave systems a practical reality. Super Mobile Broadband (SMB) is further referred to as 5G.

In a system wherein the 4G BS controls some aspects of the 5G BS and the MS communicates with the 4G BS using low frequency carrier and with 5G BS using high frequency carrier, the method of acquiring the 5G BS operating on the high frequency carrier as used in standalone system is inefficient as explained earlier. In view of the foregoing there is a need to provide an efficient method and system for acquiring the high frequency carrier.

SUMMARY

To address the above-discussed deficiencies, it is a primary object to provide disclosurea method of enabling cell acquisition in a wireless communication. The method comprising steps of determining, by a first base station, a Mobile Station (MS) located at a granularity of a first frequency carrier cell sector level, identifying at least one second base station within the first frequency carrier cell sector level, transmitting a second frequency carrier cell search command to the MS, and identifying, by the MS the second frequency carrier cell based on one or more parameters defined in the search command. The first frequency carrier cell enables the MS in searching the second frequency carrier cell by providing a predefined number of synchronization slots to be monitored based on the location information of the MS.

According to an embodiment of the present disclosure, the method further comprises transmitting a second frequency carrier cell search response to the first base station. The second frequency carrier cell search response comprises a base station identification number (BSID) and one or more identified beam identities associated with the second frequency carrier cell.

According to an embodiment of the present disclosure, the one or more parameters defined in the search command comprises a plurality of synchronization slots associated with the second base station and a plurality of synchronization signals transmitted in the plurality of synchronization slots. Further the one or more parameters defined in the search command correspond to one or more second base stations present in the identified sector of the first base station or to a subset of one or more second base stations present in the identified sector of the first base station, wherein the subset of the second base stations is determined based on the location of the MS.

According to an embodiment of the present disclosure, identifying the second frequency carrier cell comprises determining, by the MS, one or more synchronization slots to be monitored with respect to a frame timing of the first base station, monitoring the one or more synchronization slots and receives the synchronization signal from the indicated synchronization slots and identifying the BSID of the second base station along with the identity of the second frequency carrier cell associated with the second base station.

According to an embodiment of the present disclosure, the first base station is a 4G base station and the second base station is a 5G base station.

According to an embodiment of the present disclosure, the first frequency carrier cell is a low frequency cell and the second frequency carrier cell is a high frequency cell.

The embodiments herein further disclose a method of enabling cell acquisition in a wireless communication, where the method comprises determining, by a first base station, one or more second base stations based on a location of a Mobile Station (MS), identifying a plurality of synchronization slots and synchronization signals transmitted in a plurality of synchronization slots for the one or more second base stations, transmitting a second frequency carrier cell search command to the Mobile Station (MS), and identifying, by the MS, the second frequency carrier cell based on one or more parameters defined in the search command. The first frequency carrier cell enables the MS in searching the second frequency carrier cell by providing a reduced number of synchronization slots and preambles to monitor based on the location information of the MS.

According to an embodiment of the present disclosure, the method further comprises determining one or more beams present in the second frequency carrier cell sector level associated with a second base station, if only one second base station is determined.

According to an embodiment of the present disclosure, the second base station selectively transmits the one or more beams based on a location of the MSs which are connected to the base station if the locations of the MSs are known to the second base station at the second frequency carrier cell sector level.

According to an embodiment of the present disclosure, the second base station sends the synchronization signal in the slots in which the one or more beams corresponding to the second frequency carrier cell sector level are mapped.

According to an embodiment of the present disclosure, identifying the second frequency carrier cell comprises determining, by the MS, one or more synchronization slots to be monitored with respect to a frame timing of the first base station, monitoring one or more indicated synchronization slots and receives the synchronization signal from the indicated synchronization slots, and identifying the BSID of the second base station along with the identity of the second frequency carrier cell associated with the second base station.

According to an embodiment of the present disclosure, the one or more parameters comprises at least one of beams to monitor, slots to monitor, synchronization signals to monitor and timing information of the second base station with respect to the frame timing of the first base station.

According to an embodiment of the present disclosure, the method further comprises transmitting a second frequency carrier cell response command to the first base station. The second frequency carrier cell response command comprises a base station identification number (BSID) and a beam identity associated with the second frequency carrier cell.

According to an embodiment of the present disclosure, the one or more parameters defined in the search command comprises a plurality of synchronization slots associated with the identified second base station and a plurality of synchronization signals transmitted in the plurality of synchronization slots.

According to another embodiment herein a method of enabling cell acquisition in a wireless communication, the method comprising steps of broadcasting, by a first base station, information of one or more second base stations for each of a first frequency carrier cell sector level to a Mobile Station (MS), initiating search of the second base station by at least one of the first base station or the MS, determining one or more synchronization slots associated with a second frequency carrier cell and a plurality of synchronization signals which is to be monitored based on the first frequency carrier cell sector level, monitoring one or more indicated synchronization slots, receiving the synchronization signal in the one or more indicated synchronization slots, and identifying, by the MS, the second frequency carrier cell based on one or more parameters defined in the search command.

According to an embodiment of the present disclosure, the method further comprises transmitting a second frequency carrier cell response to the first base station. The second frequency carrier cell response command comprises a base station identification number (BSID) and a beam identity associated with the second frequency carrier cell.

According to an embodiment of the present disclosure, the information of one or more second base stations comprises at least one of synchronization slots to monitor and the synchronization signals to monitor for one or more second base stations in each first frequency carrier cell sector level.

Embodiments herein further disclose a system for enabling cell acquisition in a wireless communication. The system comprising a first base station and one or more second base stations in communication with a Mobile Station. The first base station comprises at least one means adapted for determining a Mobile Station (MS) located at a granularity of a first frequency carrier cell sector level, identifying at least one second base station within the first frequency carrier cell sector level and transmitting a second frequency carrier cell search command to the MS. The mobile station comprising at least one means adapted for identifying the second frequency carrier cell based on one or more parameters defined in the search command. The first frequency carrier cell enables the MS in searching the second frequency carrier cell by providing a predefined number of synchronization slots to monitor based on the location information of the MS.

According to an embodiment of the present disclosure, the second base station comprises a means for transmitting a second frequency carrier cell search response to the first base station. The second frequency carrier cell search response comprises a base station identification number (BSID) and one or more identified beam identities associated with the second frequency carrier cell.

According to an embodiment of the present disclosure, the one or more parameters defined in the search command comprises a plurality of synchronization slots associated with the second base station, and a plurality of synchronization signals transmitted in the plurality of synchronization slots.

According to an embodiment of the present disclosure, the one or more parameters defined in the search command correspond to one or more second base stations present in the identified sector of the first base station or a subset of one or more second base stations present in the identified sector of the first base station, wherein the subset of the second base stations is determined based on the location of the MS.

According to an embodiment of the present disclosure, identifying the second frequency carrier cell comprises determining, by the MS, one or more synchronization slots to be monitored with respect to a frame timing of the first base station, monitoring the one or more synchronization slots and receives the synchronization signal from the indicated synchronization slots, and identifying the BSID of the second base station along with the identity of the second frequency carrier cell associated with the second base station.

According to an embodiment of the present disclosure, the first base station is a 4G base station and the second base station is a 5G base station.

According to an embodiment of the present disclosure, the first frequency carrier cell is a low frequency cell, and second frequency carrier cell is a high frequency cell.

According to another embodiment of the present disclosure, a system for enabling cell acquisition in a wireless communication comprises a first base station in communication with a Mobile Station (MS), one or more second base stations present in a vicinity of the Mobile Station (MS). The first base station comprises at least one means for identifying a plurality of synchronization slots and synchronization signals transmitted in a plurality of synchronization slots for the one or more second base stations, transmitting a second frequency carrier cell search command to the Mobile Station (MS) and determining the second frequency carrier cell based on one or more parameters defined in the search command. The first frequency carrier cell enables the MS in searching the second frequency carrier cell by providing a reduced number of synchronization slots and preambles to monitor based on the location information of the MS.

According to an embodiment of the present disclosure, the first bases station further comprises at least one means adapted for determining one or more beams present in the second frequency carrier cell sector level associated with a second base station, if only one second base station is determined.

According to an embodiment of the present disclosure, the second base station selectively transmits the one or more beams based on a location of the MSs which are connected to the base station if the locations of the MSs are known to the second base station at the second frequency carrier cell sector level.

According to an embodiment of the present disclosure, the second base station sends the synchronization signal in the slots in which the one or more beams corresponding to the second frequency carrier cell sector level are mapped.

According to an embodiment of the present disclosure, the MS comprises at least one means adapted for determining one or more synchronization slots to be monitored with respect to a frame timing of the first base station, monitoring one or more indicated synchronization slots and receives the synchronization signal from the indicated synchronization slots and identifying the BSID of the second base station along with the identity of the second frequency carrier cell associated with the second base station.

Another embodiment herein discloses a system for enabling cell acquisition in a wireless communication. The system comprising a first station in communication with a Mobile Station (MS) for broadcasting information of one or more second base stations for each of the first frequency carrier sector level. The first station and the MS includes at least one means adapted for initiating search of the second base station, determining one or more synchronization slots associated with a second frequency carrier cell and a plurality of synchronization signals which is to be monitored based on the first frequency carrier cell sector level, monitoring one or more indicated synchronization slots, receiving the synchronization signal in the one or more indicated synchronization slots, and identifying the second frequency carrier cell based on one or more parameters defined in the search command.

According to an embodiment of the present disclosure, the system further comprises at least one means adapted for transmitting a second frequency carrier cell response to the first base station. The second frequency carrier cell response command comprises a base station identification number (BSID) and a beam identity associated with the second frequency carrier cell.

The foregoing has outlined, in general, the various aspects of the disclosure and is to serve as an aid to better understanding the more complete detailed description which is to follow. In reference to such, there is to be a clear understanding that the present disclosure is not limited to the method or application of use described and illustrated herein. It is intended that any other advantages and objects of the present disclosure that become apparent or obvious from the detailed description or illustrations contained herein are within the scope of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Although specific features of the present disclosure are shown in some drawings and not in others, this is done for convenience only as each feature may be combined with any or all of the other features in accordance with the present disclosure.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. The present disclosure provides a method and system for enhanced cell acquisition in communication systems. In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following detailed description is, therefore, not to be taken in a limiting sense, and the scope of the present disclosure is defined only by the appended claims.

Figure 1:
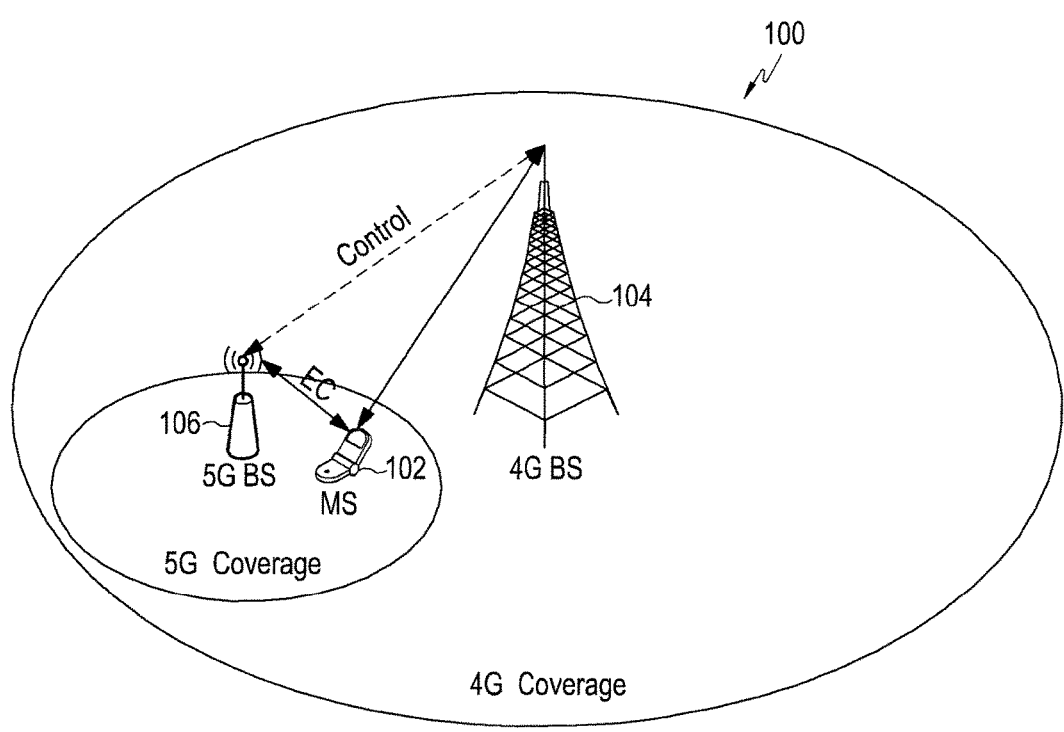
FIG. 1 is a schematic network representation of an asymmetric multiband multicarrier system according to a prior art embodiment.

FIG. 1 is a schematic network representation of an asymmetric multiband multicarrier system 100 according to a prior art embodiment. In an asymmetric multiband multicarrier SMB network where a mobile station (MS) 102 communicates with a wireless communication network using asymmetric multiband carriers comprises at least one low frequency carrier in cellular band and at least one high frequency carrier in the mmWave band, the primary carrier i.e. carrier operating on low frequencies and the secondary/extended carrier i.e. carrier operating on high frequencies are transmitted by a fourth generation (4G) base station 104 and a fifth generation (5G) base station 106 respectively. The 4G BS 104 broadcasts necessary information for identifying, acquiring and registering with itself on the low frequency carrier. The high frequency carrier with large bandwidth is used primarily for providing the high data rates services to the mobile users. The high frequency carrier is activated for example, when the MS 102 requires high data rate services which cannot be served by the low frequency carrier. Since the 4G BS 104 and 5G BS 106 are not co located, the MS 102 has to search and acquire the high frequency carrier when required. In an exemplary embodiment, 4G BS 104 controls some aspects of the 5G BS 106 and the MS 102 communicates with the 4G BS 104 using low frequency carrier and with the 5G BS using high frequency carrier. In an embodiment, the wireless communication network is considered as 3GPP LTE system. However, the present disclosure is equally applicable to any existing cellular broadband system. The frequency division duplex (FDD) variant of 3GPP LTE and 5G is considered for exemplary purpose unless stated otherwise. The scheduling interval (SI) of the 5G system is considered to be equal to that of the legacy system. Further, the term "cell" and "base station" are used interchangeably.

The lower frequencies in a cellular band having robust link characteristics can be utilized together with higher frequencies in mmWave band to overcome the reliability issues in the SMB systems. In an asymmetric multiband multicarrier heterogeneous SMB network of millimeter wave cells overlaid by existing cellular system (example 4G LTE), wherein the mobile station (MS) communicates with the communication network using asymmetric multiband carriers comprising at least one low frequency carrier in cellular band and at least one high frequency carrier in the mmWave band, the primary carrier i.e. carrier operating on low frequencies and the extended carrier i.e. carrier operating on high frequencies are transmitted by different BSs referred to as the 4G BS and the 5G BS respectively as illustrated in FIG. 1. The 4G BS broadcasts necessary information for identifying, acquiring and registering with itself on the low frequency carrier. The high frequency with large bandwidth is used primarily for providing the high data rates services to the mobile users. Since the 4G and the 5G BSs are not co-located, the MS has to search and acquire the 5G BS operating on the high frequency carrier when required.

In a standalone SMB system, wherein the BS communicates with MS using only high frequency carrier, the method of acquiring the high frequency carrier is as follows. At higher frequency the propagation path loss is higher and hence shorter propagation distance. Beam forming techniques are used to decrease the propagation path loss and to increase the propagation distance for communication at higher frequency. Beam forming can be classified into Transmission (TX) beam forming performed at a transmitting end and reception (RX) beam forming performed at a receiving end. In general, the TX beam forming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beam forming results in the increase in the directivity of a signal, thereby increasing a propagation distance. Further, since the signal is almost not transmitted in a direction other than a directivity direction, a signal interference acting on another receiving end is significantly decreased. The receiving end can perform beam forming on a RX signal by using a RX antenna array. The RX beam forming increases the RX signal strength in a specific direction by allowing propagation to be concentrated in a specific direction, and excludes a signal transmitted in a direction other than the specific direction from the RX signal, thereby providing an effect of blocking an interference signal.

Figure 2A:
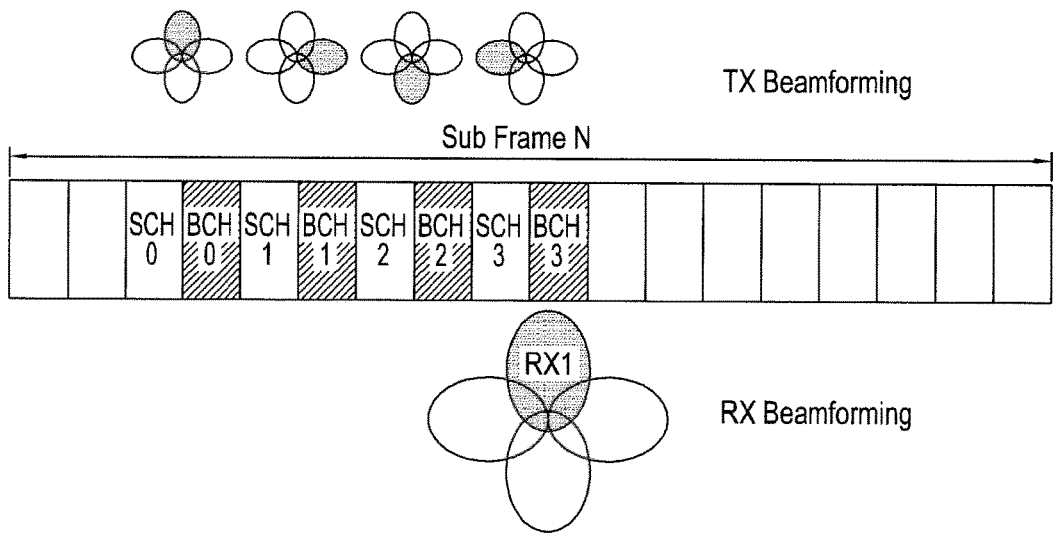
FIG. 2A-D is a schematic of SCH/BCH transmission and reception using beam forming in a standalone high frequency carrier system according to a prior art illustration.
Figure 2B:
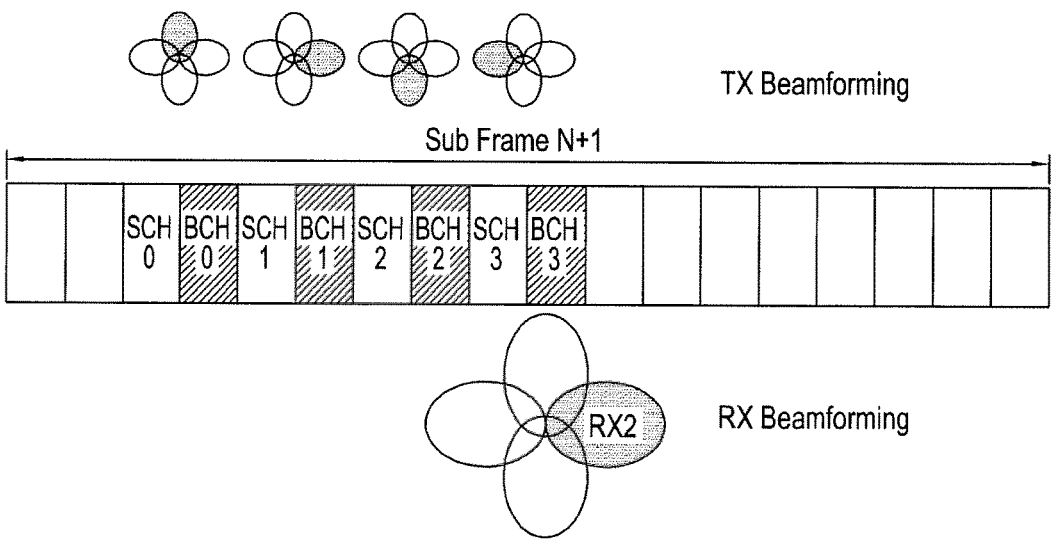
Figure 2C:
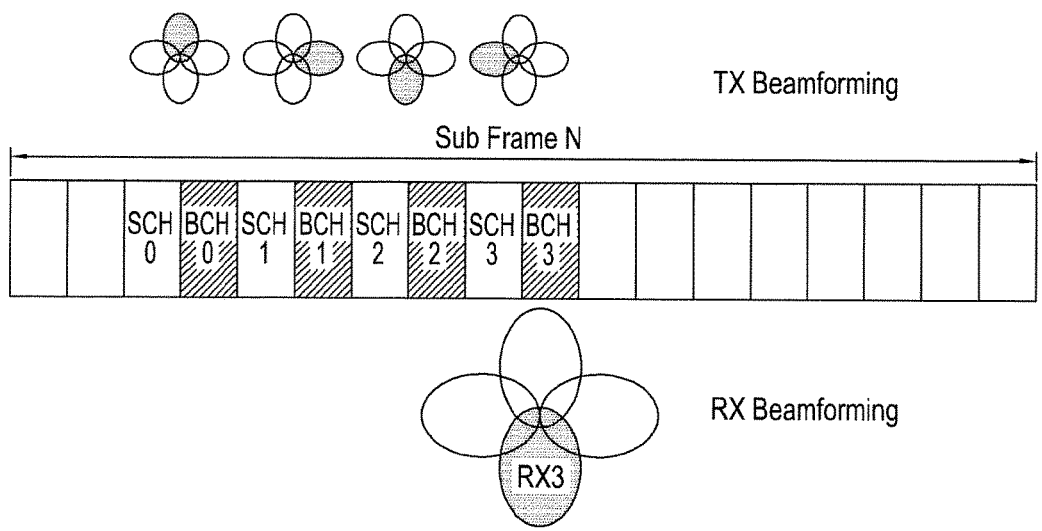
Figure 2D:
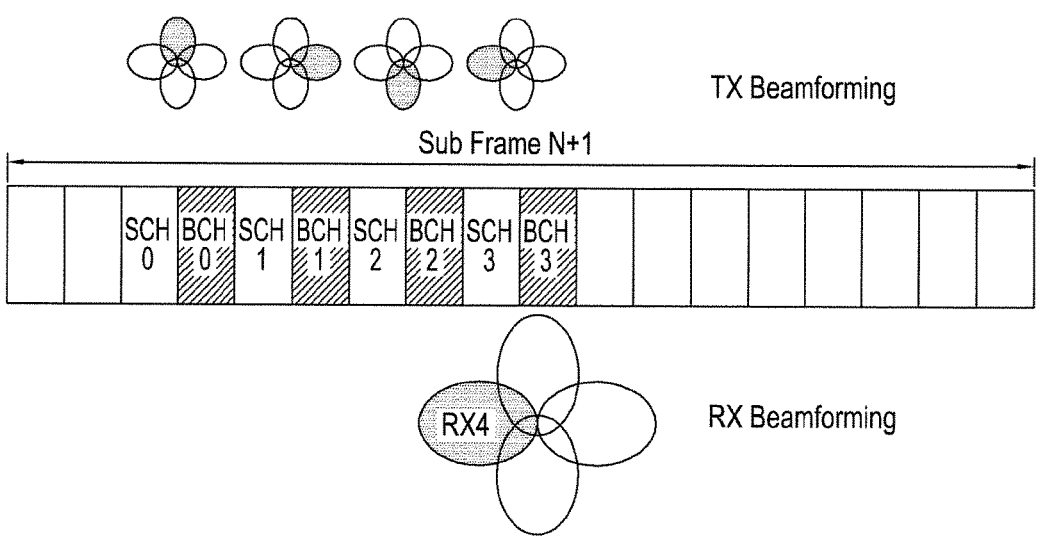

The BS transmits a synchronization signal through a Synchronization Channel (SCH) that assists MS to detect the presence of base station. The BS also transmits the broadcast signal through a Broadcast Channel (BCH). The BCH carries essential system information, which enables MS to have initial communication with the BS. The SCH & BCH are transmitted repetitively by performing beam forming on the channels with different transmission beams wherein each TX beam transmits the SCH and BCH in different direction. Because of hardware limitation (one antenna array is needed for one beam direction) the TX beams in different directions are transmitted at different times (slots). The MS uses receive beam forming to detect the synchronization signal. MS uses multiple RX beams to detect the SCH transmitted using multiple TX beams. Consider for example, SCH & BCH is transmitted using 4 TX beams and MS uses 4 RX beams to search the SCH & BCH. 4 TX beams are transmitted in four different time durations (e.g. slots) in a sub frame on the high frequency carrier as illustrated in FIG. 1 (assuming one TX chain). The MS first configures the receiver antenna array to receive using first Rx beam Rx1. The MS receives and searches for SCH for one sub frame duration using first Rx beam Rx1 as illustrated in FIG. 2A. The MS then configures the receiver antenna array to receive using second Rx beam Rx2 as illustrated in FIG. 2B. The MS receives and searches for SCH for one sub frame duration using second Rx beam Rx2. The same procedure is repeated for Rx beam 3 and Rx beam 4 as illustrated in FIG. 2C and FIG. 2D. Based on the reception in four sub frames, MS determines the best TX and RX beam pair. During the initial acquisition of high frequency carrier, MS is not synchronized with the transmissions of the base station and hence has to continuously process the received signals to detect the SCH. The MS also has to determine the TX beam ID in order to report the best TX beam to the BS. The TX beam ID may be indicated in the synchronization signal transmitted in SCH by scrambling the synchronizing signal with different scrambling code for different TX beams. This increases the processing effort by four times for MS as the MS has to descramble the received synchronization signal using four scrambling codes. Alternately the TX beam ID may be indicated as an information element in the system information carried in BCH or by using the different scrambling code for different TX beam transmitting the BCH. In this case, after detecting the SCH MS has to receive the BCH to determine the TX beam ID. This method also increases the processing effort for MS as MS has to receive and decode the BCH.

Figure 3A:
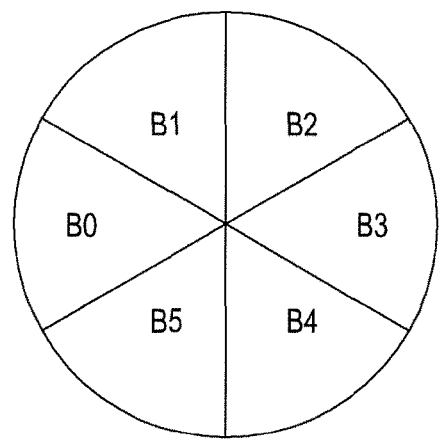
FIG. 3A is an exemplary schematic representation of beams transmitted by a 5G base station, according to an embodiment of the present disclosure.
Figure 3B:
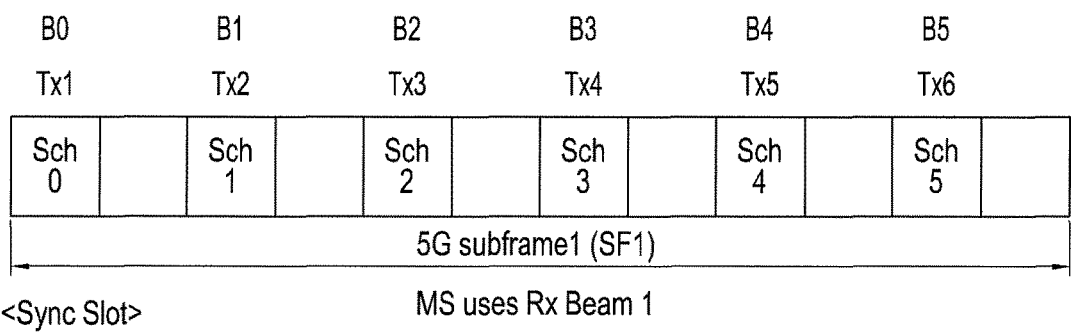
FIG. 3B is an exemplary schematic representation of synchronization slots of a 5G base station, according to an embodiment of the present disclosure.

FIG. 3A is an exemplary schematic representation of beams transmitted by a 5G base station, according to an embodiment of the present disclosure. According to FIG. 3A, the 5G BS 106 transmits 6 beams of 60 degree bandwidth each carrying a synchronization signal. A beam is identified by a logical ID known as beam ID. For example, the beams in the FIG. 3A are numbered as B0 to B5. As mentioned earlier, the 5G BS 106 may not be able to transmit all the beams simultaneously due to limitation of hardware resources (Tx chain). In the embodiments herein, it is assumed that the 5G BS 106 transmits only one beam at a time due to having only one Tx chain. A slot where a beam carrying the synchronization signal is transmitted is known as a synchronization slot. A beam is transmitted on a slot. In order to identify which beam is transmitted on which slot a beam to slot mapping is defined. Each synchronization beam carries a synchronization signal (also referred to as preamble). In order to identify which preamble is transmitted on which beam a preamble to beam mapping is defined. If there is only one Tx chain at the transmitter then, the number of synchronization slots required per repetition period of synchronization signal is equal to the number of beams carrying the synchronization signal. For example, FIG. 3B is an exemplary schematic representation of synchronization slots of a 5G BS. In FIG. 3B, synchronization slots are numbered as ScH0 to ScH5 and are repeated in every sub frame. In each synchronization slot, a different beam is transmitted so that the entire 360 degree space is covered. For example, beam B0 is transmitted in synchronization slot Sch0, beam B1 is transmitted in synchronization slot Sch1 and so on. Beam B0 may contain synchronization preamble 0, beam B1 may carry synchronization preamble 1 and so on. Alternatively, all the beams can carry the same synchronization preamble. Further, if MS 102 also applies receive beam forming, the number of 5G sub frames it needs to monitor is equal to the number of receive beams it has wherein a 5G sub frame carries the synchronization slot corresponding to all the transmit directions (beams). For example, if MS 102 has two receive beams of 180 degree each, it needs to monitor two 5G sub frames in order to capture the best Tx-Rx beam pair.

Figure 4:
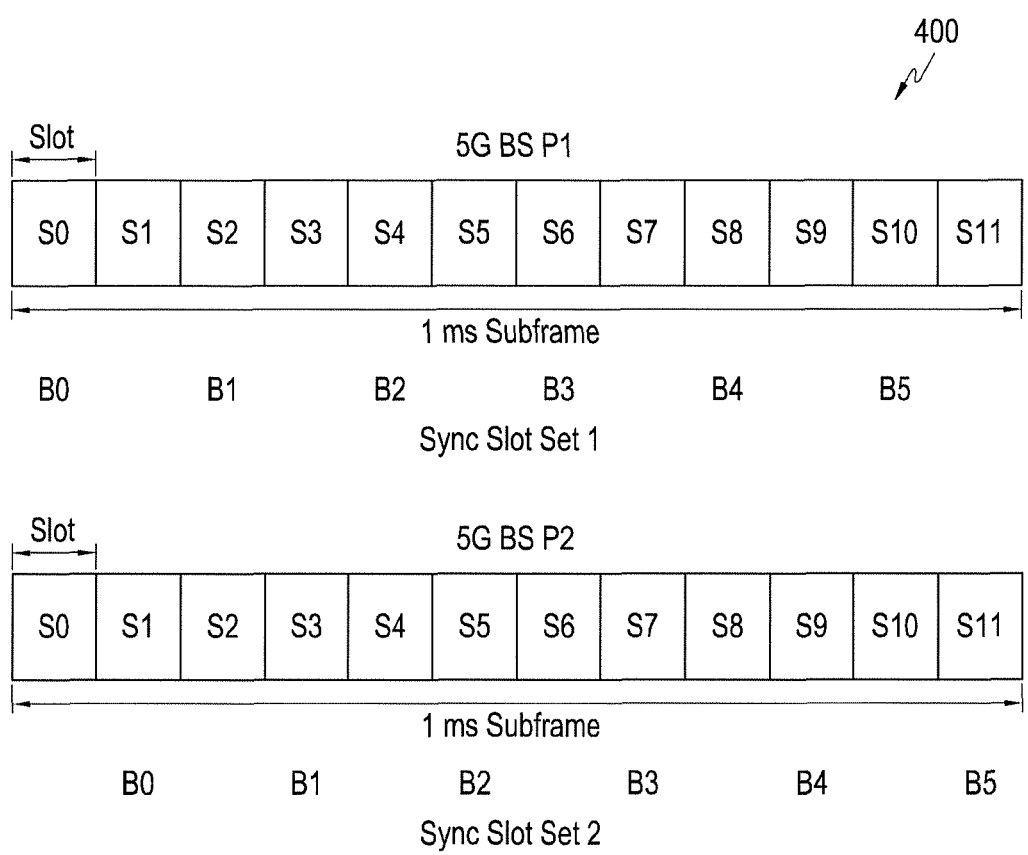
FIG. 4 is a schematic representation of synchronization slot sets, according to an embodiment of the present disclosure.

FIG. 4 is a schematic representation of synchronization slot sets, according to an embodiment of the present disclosure. In an embodiment of the present disclosure, multiple sets of synchronization slots are defined in the 5G system. A synchronization slot is a timeslot where a synchronization signal/preamble is transmitted by the 5G BS 106. A BS follows one of set of the synchronization slots among the multiple defined sets. Neighboring BSs can follow different sets so that synchronization slots from neighboring 5G BSs 106 do not collide. In another embodiment of the present disclosure, the set of synchronization slots to be used by the BS is determined dynamically for example considering the interference situation. Alternatively, there can be a single set of the synchronization slots such that all the BSs in the system follow the same set of the synchronization slots. This single set of synchronization slots can be pre specified. If multiple sets of synchronization slots are defined or the synchronization slots are determined dynamically, the determined synchronization slots for a 5G BS 106 are given to the MS 102 by the associated 4G BS 104 in a broadcast or unicast manner.

Figure 5:
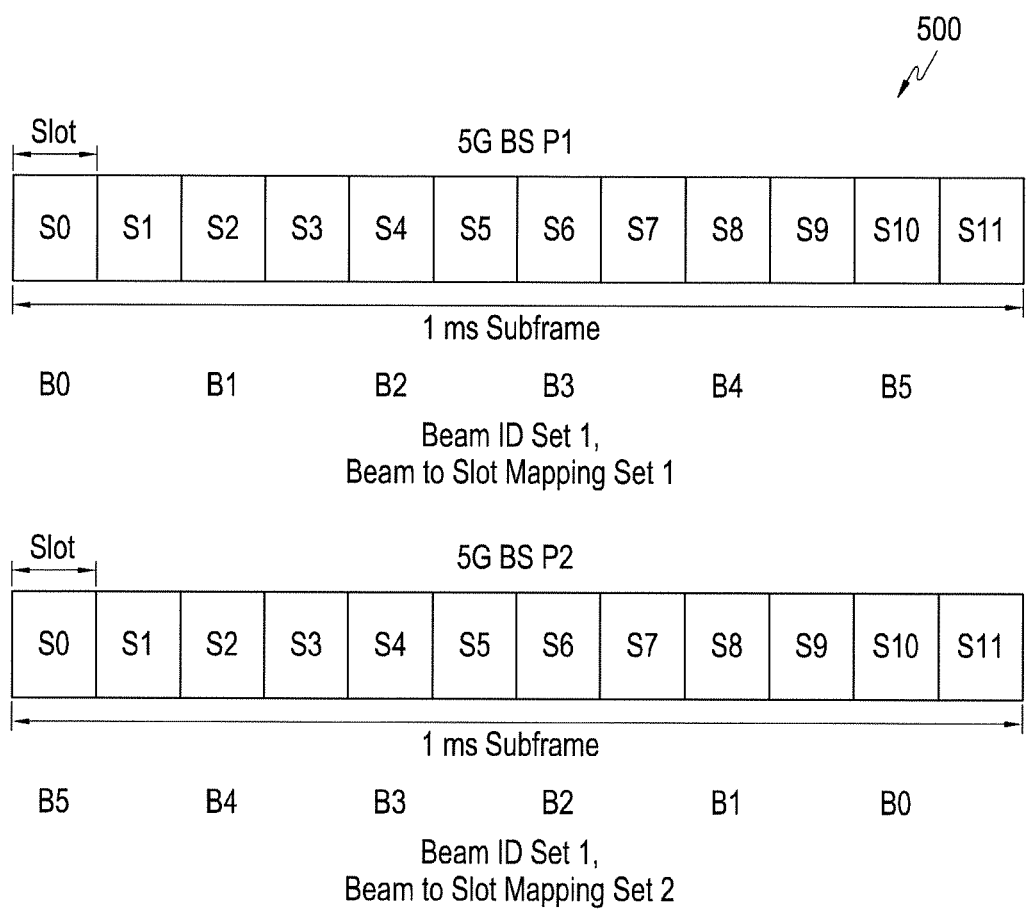
FIG. 5 is a schematic representation of beam to slot mapping sets, according to an embodiment of the present disclosure.

FIG. 5 is a schematic representation of beam to slot mapping sets, according to an embodiment of the present disclosure. According to FIG. 5, multiple sets of beam to slot mapping are defined in the 5G system. A beam to slot mapping defines which beam is transmitted in which time slot by the 5G BS 106. A BS follows one of a set of the beam to slot mapping among the multiple defined sets. Neighboring BSs can follow different sets so that the MS 102 can decode multiple beams from different BSs in a single slot. Alternatively, there can be a single beam to slot mapping defined in the system such that all the BSs in the system follow the same set of the beam to slot mapping. This single set of beam to slot mapping can be pre specified. In another embodiment, the set of beam to slot mapping to be used by the BS is determined dynamically for example, by considering the already used beam to slot mapping to be used by the neighboring BSs. In another embodiment, the set of beam to slot mapping to be used by the BS is chosen by the BS in random manner. If multiple sets of beam to clot mapping are defined or the beam to slot mapping are determined dynamically, the determined beam to slot mapping for a 5G BS 106 are given to the MS 102 by the associated 4G BS 104 in a broadcast or unicast manner.

Figure 6:
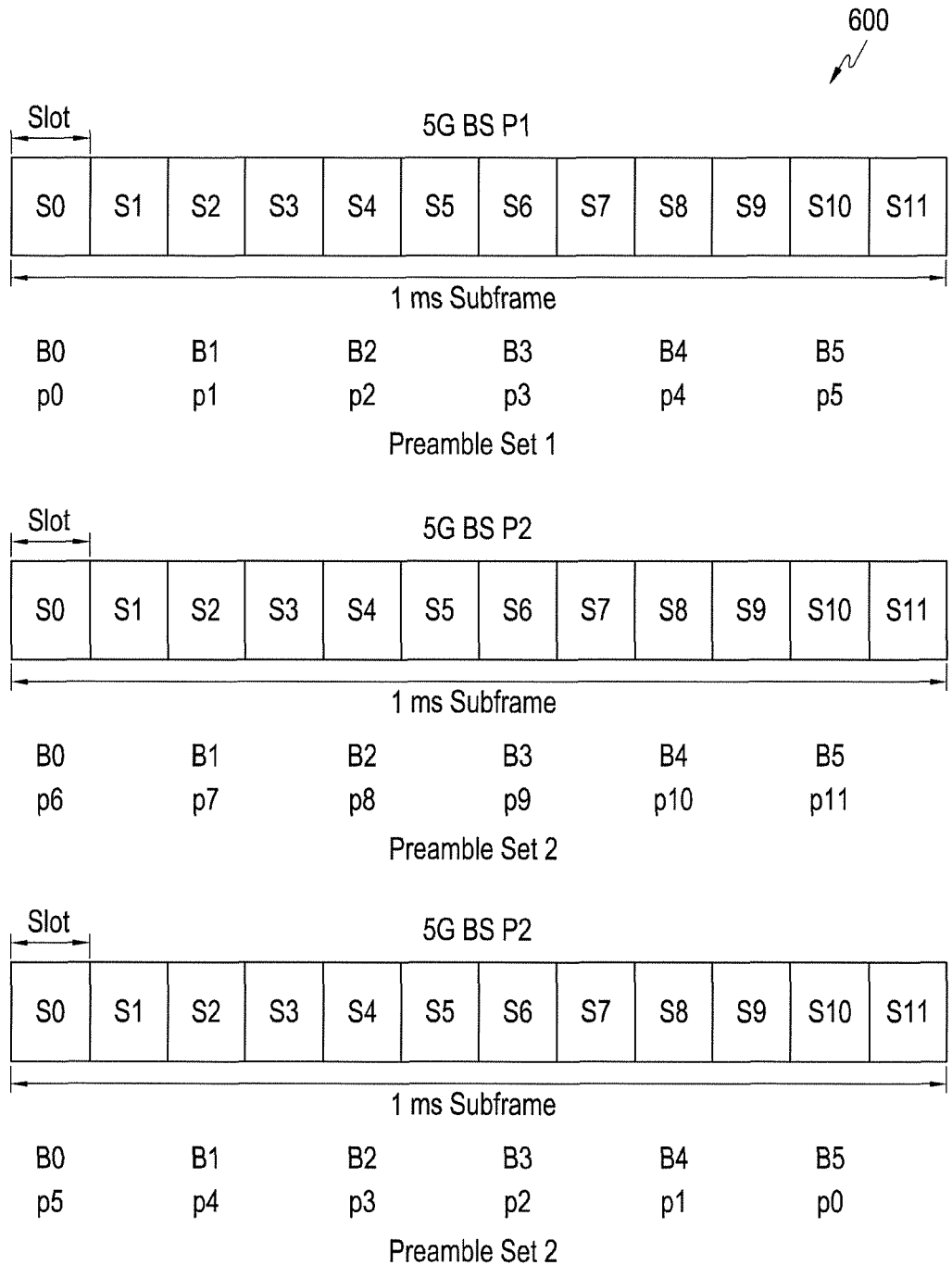
FIG. 6 is a schematic representation of preamble to beam mapping sets, according to an embodiment of the present disclosure.

FIG. 6 is a schematic representation of preamble to beam mapping sets, according to an embodiment of the present disclosure. According to FIG. 6, multiple sets of preamble to beam mapping can be defined in the 5G system. A preamble is a synchronization signal which is transmitted by the 5G BS 106 in the synchronization slots. There can be one or more preambles defined in the system. A preamble to beam mapping defines which preamble is transmitted in which beam. A BS follows one set of the preamble to beam mapping among the multiple defined sets. Neighboring BSs can follow different sets so that preambles from neighboring cells do not collide. Alternatively, the preamble to beam mapping can be fixed in the system. This fixed mapping can be pre-specified. For example, consider there are six preambles defined in the system and considering that there are six beams in the system, the preamble to beam mapping can be fixed such that all the BSs in the system follow the same mapping. In another embodiment, the set of preamble to beam mapping to be used by the BS is determined dynamically for example by considering the already used preamble to beam mapping by the neighboring BSs. In another embodiment, the set of preamble to beam mapping to be used by the BS is chosen by the BS in a random manner. In another embodiment, the preamble to beam mapping is derived based on the BS ID. In one scenario all the beams of a 5G BS 106 use the same preamble while in another scenario each beam has a different preamble. In another scenario some of the beams of a 5G BS 106 use the same preamble. If multiple sets of preamble to beam mapping are defined or the preamble to beam mapping is determined dynamically, the determined preamble to beam mapping for a 5G BS 106 are given to the MS 102 by the associated 4G BS 104 in a broadcast or unicast manner.

A beam is identified by the direction of transmission. A logical beam ID can be assigned to each beam for example in FIG. 3, beams are numbered as B0~B5 as explained earlier. In one embodiment, the beam ID can be sent by the 5G BS 106 explicitly in the BCH information transmitted in the beam. In another embodiment, the beam ID can be derived by the MS 102 from the slot number in which the beam is transmitted based on the beam to slot mapping when the beam to slot mapping is known to the MS 102. In another embodiment, the beam ID can be derived from the preamble ID transmitted in the beam based on the preamble to beam mapping when the beam to slot mapping is known to the MS 102.

In one embodiment of the present disclosure, when the 5G cell search is required, the 4G cell to which the MS 102 is camped provides information for assisting the 5G cell search based on the location of the MS 102. The information provided by the 4G BS 104 includes at least one of the slots of 5G to monitor, the preambles to monitor and the beams to monitor. The slots of 5G to monitor can help in reducing the power consumption of the MS 102 as the MS 102 can now monitor only few slots instead of all. The preambles to monitor for the 5G can further help in reducing the power consumption of the MS 102 as the MS 102 now needs to perform less number of correlations for detecting the received preamble. Further this information of the slots to monitor and the preambles to monitor can be provided for more than one 5G BS 106. It can be provided individually for each 5G BS 106 or can be provided together for a group of 5G BSs 106. The location of the MS 102 can be known at the 4G sector level or even at the 5G BS sector level. The location of the MS 102 can be determined by any existing methods like GPS, cell triangulation etc. Alternatively, the location can be fed back by the MS 102 during the connection setup. Further it is assumed that the 4G BS 104 is aware of the location of the 5G BSs 106 that it overlays. If the location of the MS 102 is known to the 4G BS 104 at the 4G BS sector level, then the 4G BS 104 can provide the information on the slots to monitor for 5G and the preambles to monitor for 5G considering all the 5G BSs 106 in the 4G sector the MS 102 is located in. For example, FIG. 7 is a schematic of a network diagram illustrating 4G macro BS assisted 5G cell search, according to an embodiment of the present disclosure.

Figure 7:
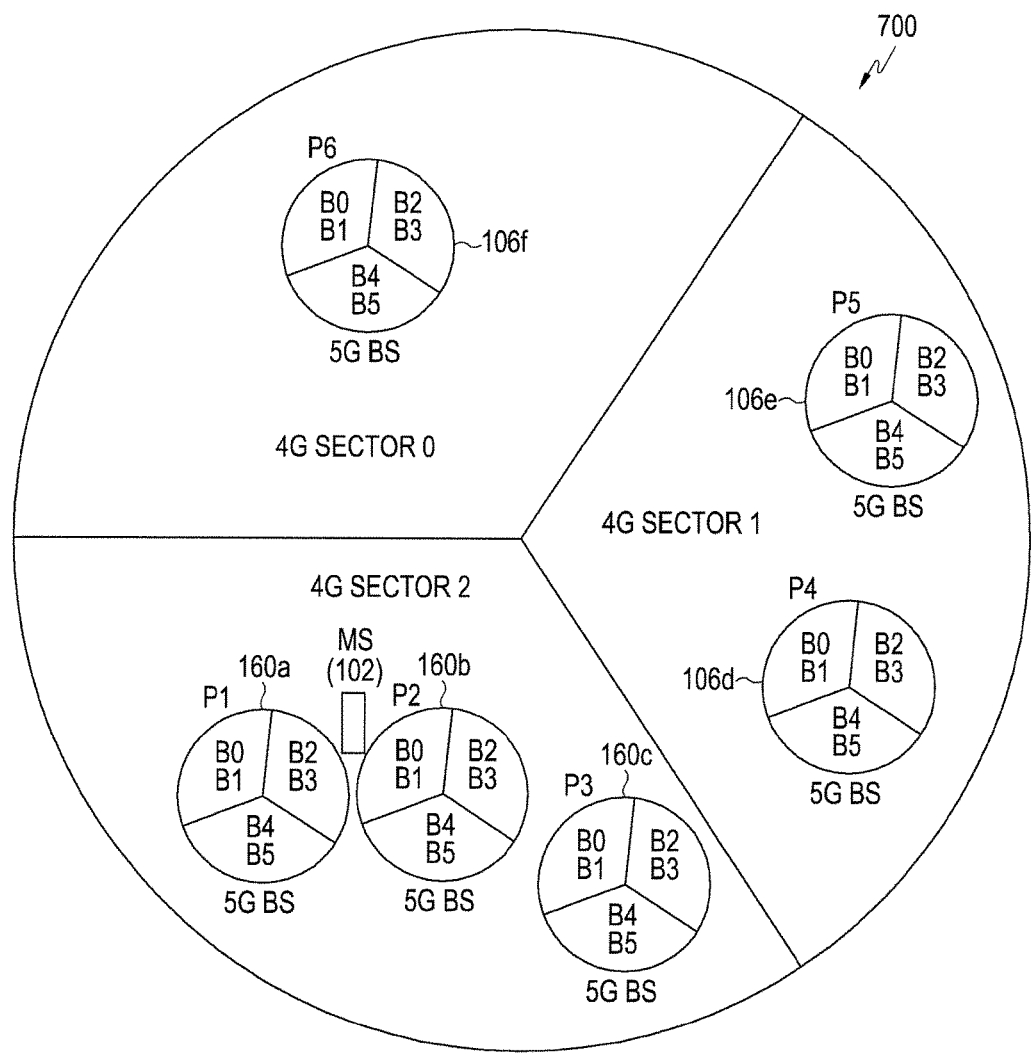
FIG. 7 is a schematic of a network diagram illustrating 4G macro BS assisted 5G cell search, according to an embodiment of the present disclosure.

In FIG. 7, the 4G BS 104 provides information on the slots to monitor for 5G and the preambles to monitor for 5G considering the 5G BSs 106 P1, P2 and P3 which are present in the 4G sector 2 in which the MS 102 is determined to be located. Further, if narrowed down location information is known within the 4G sector, then the information on the slots to monitor for 5G and the preambles to monitor for 5G can be provided by the 4G BS 104 considering only few (but not all) 5G BSs 106.

If the location of the MS is known to the 4G BS 104 at the 5G BS sector level, then the 4G BS 104 with which the MS 102 is connected to, can provide information on the slots to monitor for 5G and the preambles to monitor for 5G corresponding to the beams as per the location of the MS 102 in the determined 5G BS 106. This is further illustrated in FIG. 7 wherein the 4G BS 104 provides information for Sector 1 of 5G BS P1 (Beams B2 & B3). The 4G BS 104 can additionally provide information on slots to monitor and Preamble to Slot mapping of Beams of neighboring 5G BS sector of that 5G BS 106 as per MS 102 location. For example, in FIG. 7 the 4G BS 104 provides information for Sector 1 of 5G BS P1 (Beams B2 & B3). Further, the 4G BS 104 may additionally provide information on Slots to monitor and Preamble to Slot mapping of Beams of neighboring 5G sectors of neighboring 5G BSs as per MS 102 location. For example, in FIG. 7 the 4G BS 104 provides information for Sector 1 of 5G BS P1 (Beams B2 and B3) and Sector 0 of BS P2 (Beams B0 and B1). It is to be noted that the neighboring 5G BSs 106 may be associated with different 4G BSs 104.

Figure 8:
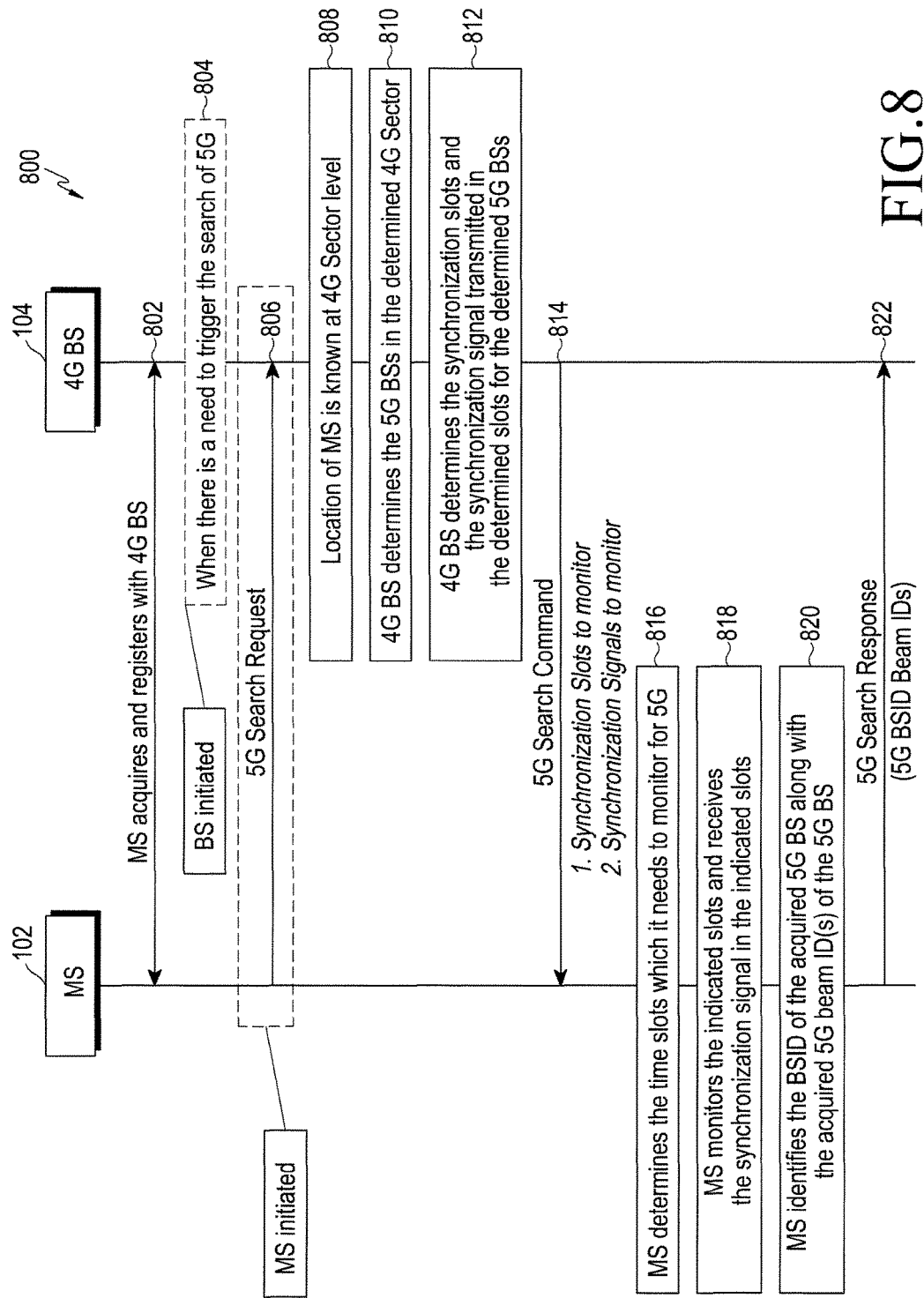
FIG. 8 is an exemplary flowchart illustrating a method of 4G macro BS assisted 5G cell search, according to an embodiment of the present disclosure.

FIG. 8 is a schematic of a network diagram illustrating 4G macro BS assisted 5G cell search, according to an embodiment of the present disclosure. At step 802, the MS 102 acquires and registers with a first base station. At step 804, the first BS triggers a search for second frequency carrier cell when it determines that the search is required to be carried out. Alternatively, at step 806, MS 102 can also initiate a search for the second frequency carrier cell by sending a second frequency carrier cell search request to the first base station. At step 808, the first base station determines a MS 102 located at a granularity of a first frequency carrier cell sector level. At step 810, the first base station identifies at least one second base station within the first frequency carrier cell sector level.

At step 812, the first base station determines one or parameters for the identified at least one second base station. The one or more parameters comprises a plurality of synchronization slots associated with the second base station and a plurality of synchronization signals transmitted in the plurality of synchronization slots. Further, the one or more parameters correspond to one or more second base stations present in the identified sector of the first base station. Further, the one or more parameters also correspond to a subset of one or more second base stations present in the identified sector of the first base station, wherein the subset of the second base stations is determined based on the location of the MS 102.

At step 814, the first base station transmits a second frequency carrier cell search command to the MS 102 which can contain synchronization slots to monitor and/or synchronization signals to monitor. At step 816, the MS 102 identifies the second frequency carrier cell based on one or more parameters defined in the search command wherein the first frequency carrier cell enables the MS 102 in searching the second frequency carrier cell by providing a predefined number of synchronization slots to be monitored based on the location information of the MS 102. The MS 102 determines one or more synchronization slots to be monitored with respect to a frame timing of the first base station. At step 818, the MS monitors the one or more synchronization slots and receives the synchronization signal from the indicated synchronization slot. At step 820, the MS 102 identifies a base station identification number (BSID) of the second base station along with the identity of the second frequency carrier cell associated with the second base station. At step 822, the MS 102 transmits a second frequency carrier cell search response to the first base station wherein the second frequency carrier cell search response comprises the BSID and one or more identified beam identities associated with the second frequency carrier cell.

In an exemplary embodiment, consider a first base station as a 4G BS 104, a second base station as a 5G BS 106, a first frequency carrier cell as a 4G cell, a second frequency carrier cell as a 5G, a first frequency carrier cell sector level is a 4G sector level, and a second frequency carrier cell sector level as a 5G sector level. According to FIG. 8, the MS 102 operation when the location of the MS 102 is known at the 4G sector level is described. In the first step, the 4G BS 104 determines the location of the MS 102 at the granularity of the 4G sector level. In the second step, the 4G BS 104 determines the 5G BSs 106 which are present in the determined 4G sector. For example considering FIG. 7, the 4G BS 104 determines the 5G BSs P1, P2 & P3 to be present in the 4G sector level. In the third step, the 4G BS 104 determines the parameters which can assist the MS 102 in the search of the 5G BSs 106 wherein the parameters include at least one of beams to monitor, slots to monitor and the synchronization signals to monitor based on the methods as explained earlier and considering the determined 5G BSs 106. Additionally, the 4G BS 104 also provides the timing information of the 5G BSs 106 with respect to the frame timing of the 4G BS 104 as explained earlier. In the fourth step, based on the information received in step 3, the MS 102 attempts to search and synchronize to a 5G BS 106 by monitoring only the synchronization slots that are indicated by the 4G BS 104 and then performs correlation for the preambles indicated by the 4G BS 104.

Figure 9:
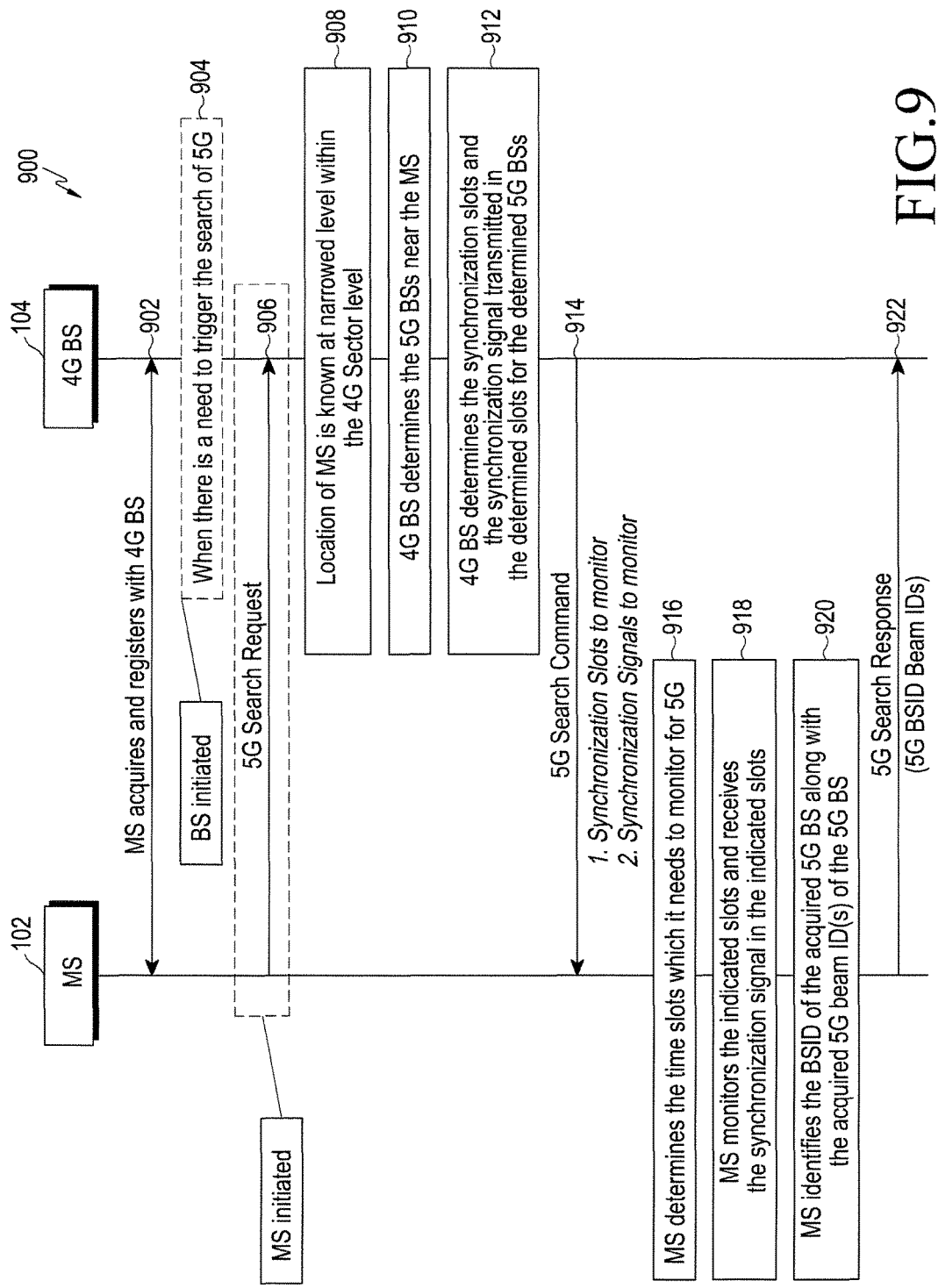
FIG. 9 is an exemplary flowchart illustrating a method of 4G macro BS assisted 5G cell search, according to another embodiment of the present disclosure.

FIG. 9 is an exemplary flowchart illustrating a method of 4G macro BS assisted 5G cell search, according to another embodiment of the present disclosure. At step 902, the MS 102 acquires and registers with a first base station. At step 904, the first BS triggers a search for second frequency carrier cell when it determines that the search is required to be carried out. Alternatively, at step 906, MS 102 can also initiate a search for the second frequency carrier cell by sending a second frequency carrier cell search request to the first base station. At step 908, the first BS identifies the location of the MS 102 at narrowed level within the first frequency carrier cell sector level. At step 910, the first BS determines one or more second base stations based on the location of the MS 102. At step 912, the first BS identifies a plurality of parameters which can assist the MS 102 in the search of the determined second one or more second base stations, wherein the plurality of parameters include at least one of beams to monitor, a plurality of synchronization slots and synchronization signals transmitted in a plurality of synchronization slots for the one or more second base stations. At step 914, the first BS transmits a second frequency carrier cell search command to the MS 102. At step 916, the MS 102 determines one or more synchronization slots to be monitored with respect to a frame timing of the first base station for the second frequency carrier cell. At step 918, the MS 102 monitors the one or more indicated synchronization slots and receives the synchronization signal from the indicated synchronization slots.

At step 920, the MS 102 identifies a BSID of the second base station along with the identity of the second frequency carrier cell associated with the second base station. Hence, the MS 102 identifies the second frequency carrier cell based on one or more parameters defined in the search command wherein the first frequency carrier cell enables the MS 102 in searching the second frequency carrier cell by providing a reduced number of synchronization slots and preambles to monitor based on the location information of the MS 102. The one or more parameters comprises at least one of beams to monitor, slots to monitor, synchronization signals to monitor and timing information of the second base station with respect to the frame timing of the first base station.

At step 922, the MS 102 transmits a second frequency carrier cell response command to the first base station wherein the second frequency carrier cell response command comprises the BSID and a beam identity associated with the second frequency carrier cell.

In an exemplary embodiment, consider a first base station as a 4G BS 104, a second base station as a 5G BS 106, a first frequency carrier cell as a 4G cell, a second frequency carrier cell as a 5G, a first frequency carrier cell sector level is a 4G sector level, and a second frequency carrier cell sector level as a 5G sector level. According to FIG. 9, the MS 102 operation when the location of the MS 102 is known at a narrowed down granularity within the 4G sector level and when it is still not known at the 5G sector level is illustrated. In step one, the 4G BS 104 determines the location of the MS 102 at a narrowed down granularity within the 4G sector level. In step two, the 4G BS 104 determines the 5G BSs 106 which are present in the determined narrowed down location within the 4G sector in step one. For example considering FIG. 7, the 4G BS 104 determines the 5G BSs P1 & P2 to be present in the narrowed down location within the 4G sector level. In step three, the 4G BS 104 determines the parameters which can assist the MS 102 in the search of the determined 5G BSs 106 wherein the parameters include at least one of beams to monitor, slots to monitor and the synchronization signals to monitor based on the methods as explained earlier and considering the determined 5G BSs 106 in the step three. In addition the 4G BS 104 can also provide the timing information of the 5G BSs 106 with respect to the frame timing of the 4G BS 104 as explained earlier. In Step four, based on the information received in step three, the MS 102 attempts to search and synchronize to a 5G BS 106 by monitoring only the synchronization slots that are indicated by the 4G BS 104 and then performs correlation for the preambles indicated by the 4G BS 104.

Figure 10:
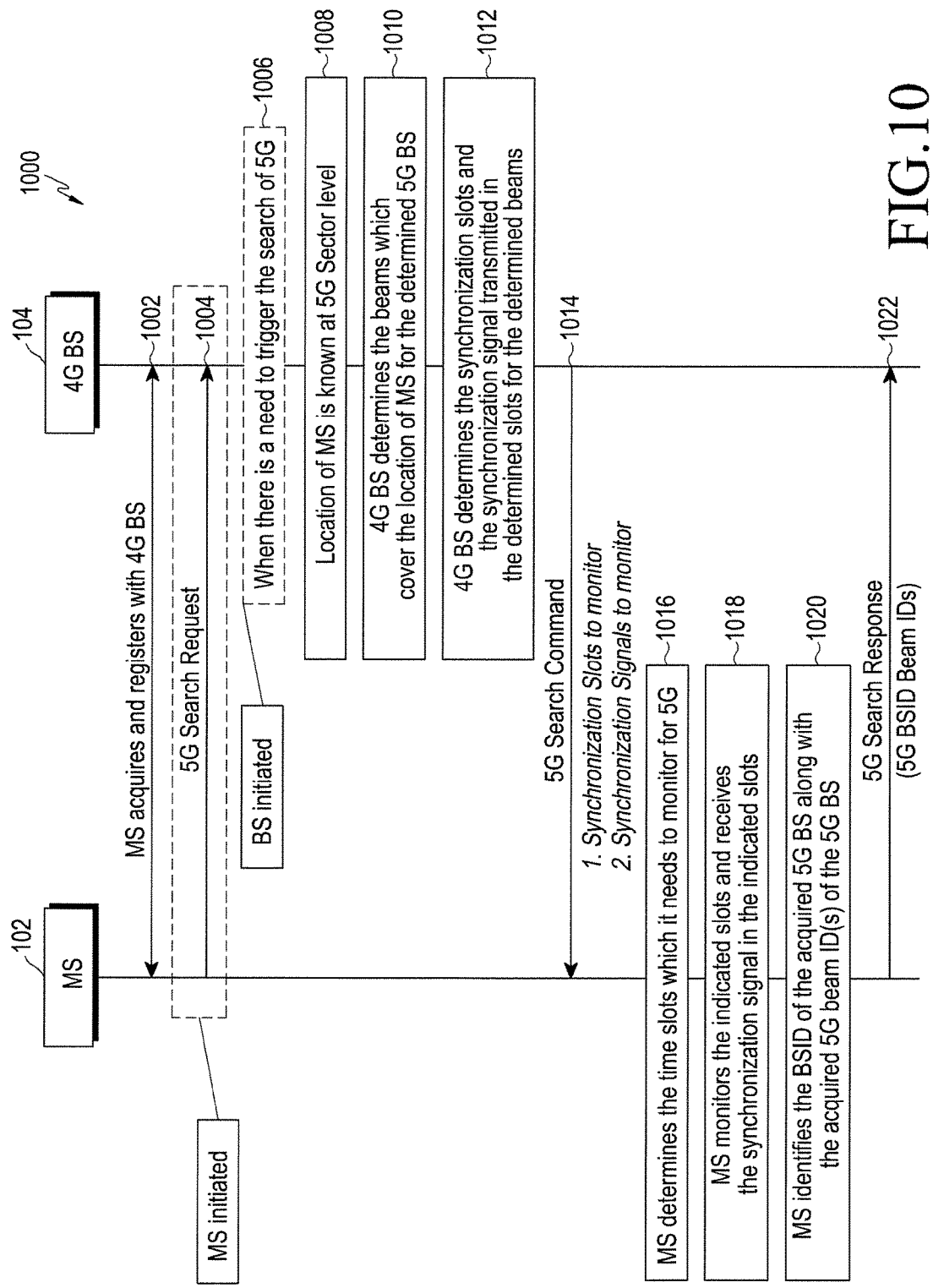
FIG. 10 is an exemplary flowchart illustrating a method of 4G macro BS assisted 5G cell search, according to yet another embodiment of the present disclosure.

FIG. 10 is an exemplary flowchart illustrating a method of 4G macro BS assisted 5G cell search, according to yet another embodiment of the present disclosure. In FIG. 10, the MS 102 operation when the location of the MS 102 is known at the 5G sector level is depicted. At step 1008, the 4G BS 104 determines the location of the MS 102 at the granularity of the 5G sector level within a 5G BS 106. At step 1010, the 4G BS 104 determines one or more beams present in the determined 5G sector of the determined 5G BS 106. For example considering FIG. 7, the 4G BS 104 determines the beams B2 & B3 of the 5G BS 106 P1 cover the region around the location of the MS 102. At step 1012, the 4G BS 104 determines the parameters which can assist the MS 102 in the search of the determined 5G BS 106 wherein the parameters include at least one of beams to monitor, slots to monitor and the synchronization signals to monitor based on the methods as explained earlier and considering the determined 5G BSs 106 in the step 1012. For example, the 4G BS 104 can indicate the beams B2 & B3 and the slots in which the 5G BS 106 P1 transmits these beams along with the synchronization signal transmitted in these beams. In addition, the 4G BS 104 can also provide the timing information of the 5G BSs 106 with respect to the frame timing of the 4G BS 104 as explained earlier. Then, based on the information received in step 1012, the MS 102 attempts to search and synchronize to a 5G BS 106 by monitoring only the synchronization slots that are indicated by the 4G BS 104 and then performs correlation for the preambles indicated by the 4G BS 104.

Figure 11:
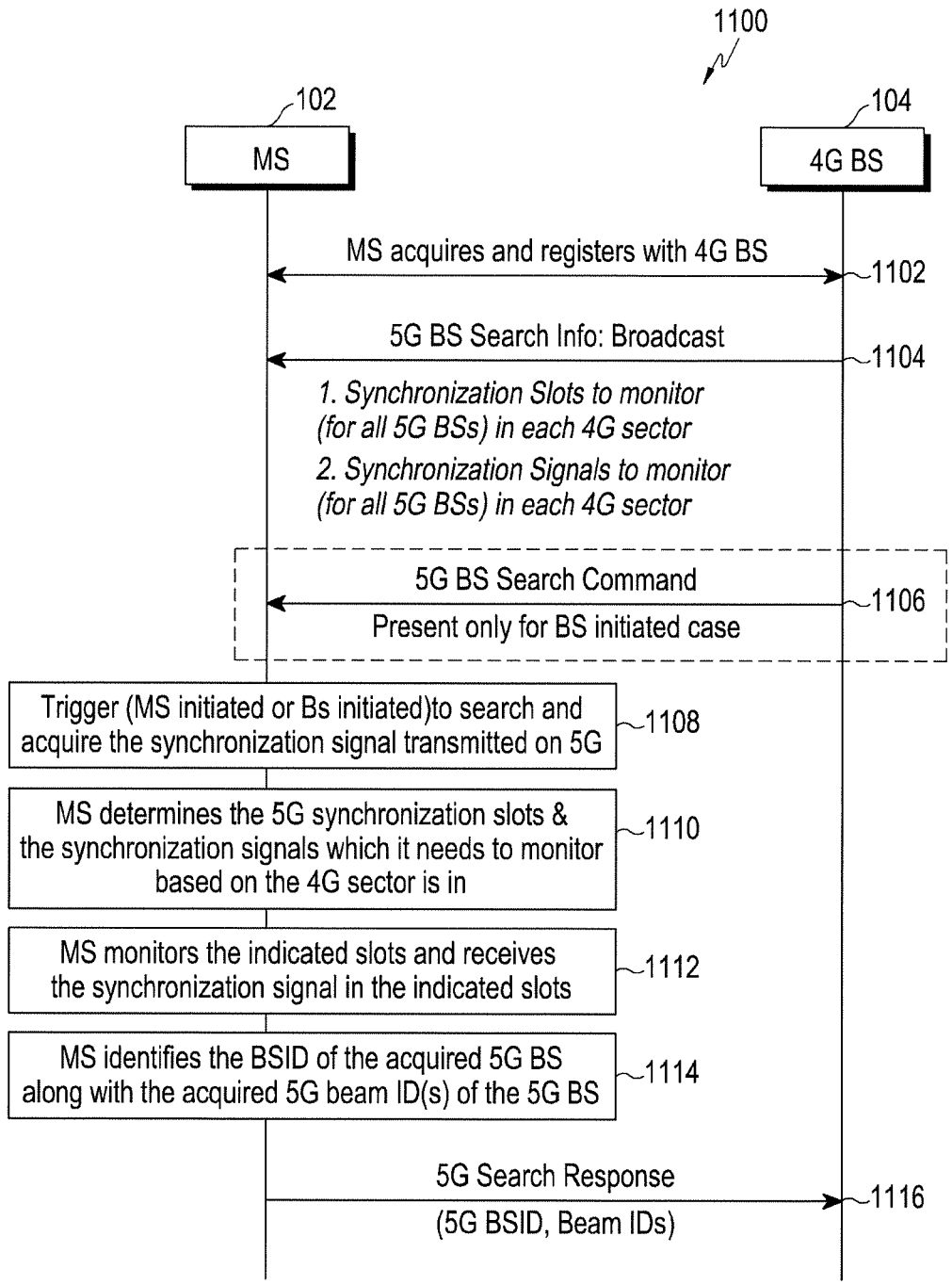
FIG. 11 is an exemplary flowchart illustrating a method of 4G macro BS assisted 5G cell search, according to yet another embodiment of the present disclosure.

FIG. 11 is an exemplary flowchart illustrating a method of 4G macro BS assisted 5G cell search, according to yet another embodiment of the present disclosure. At step 1102, the MS 102 acquires and registers with a first base station. At step 1104, the first base station broadcasts information of one or more second base stations for each of a first frequency carrier sector level to the MS 102. The information of one or more second base stations comprises at least one of synchronization slots to monitor and the synchronization signals to monitor for one or more second base stations in each first frequency carrier cell sector level. At step 1106, the first base station sends a search command for the second base station to the MS 102. At step 1108, at least one of the first base station initiates search of the second base station to the MS 102 and acquires the synchronization signal transmitted on a second frequency carrier cell. Alternatively, the MS 102 can also initiate the search for the second base station. At step 1110, the MS 102 determines one or more synchronization slots associated with the second frequency carrier cell and a plurality of synchronization signal which is to be monitored based on the first frequency carrier cell sector level. At step 1112, the MS 102 monitors one or more indicated synchronization slots and receives the synchronization signal in the one or more indicated synchronization slots. At step 1114, the MS 102 identifies the second frequency carrier cell based on one or more parameters defined in the search command. At step 1116, the MS 102 transmits a second frequency carrier cell response to the first base station wherein the second frequency carrier cell response command comprises a base station identification number (BSID) and a beam identity associated with the second frequency carrier cell.

In an exemplary embodiment, consider a first base station as a 4G BS 104, a second base station as a 5G BS 106, a first frequency carrier cell as a 4G cell, a second frequency carrier cell as a 5G, a first frequency carrier cell sector level is a 4G sector level, and a second frequency carrier cell sector level as a 5G sector level. According to FIG. 11, the MS 102 operation when the 4G BS 104 broadcasts the information of the 5G BSs 106 for each of its sector is illustrated. The information includes at least one of synchronization slots to monitor and the synchronization signals to monitor considering all the 5G BSs 106 in that 4G sector. In step 1, the 4G BS 102 broadcasts the said information. In step 2, either the 4G BS 104 triggers the search of 5G BSs 106 or the MS 102 initiates the search of 5G BSs 106 on its own. In step 3, the MS 102 determines the synchronization slots to monitor and the synchronization signals to monitor based on the 4G sector it is located in. In step 4, based on the information received in step 3, the MS 102 attempts to search and synchronize to a 5G BS 106 by monitoring only the synchronization slots that are indicated by the 4G BS 104 and then performs correlation for the preambles indicated by the 4G BS 104. The 4G BS 104 may also broadcast the location information of the 5G BSs 104 for each of its sector along with the synchronization slots to monitor and the synchronization signals to monitor corresponding to each 5G BS 106.

It is to be noted that in all the preceding embodiments wherever applicable, the 4G BS 104 may provide at least one of beam to slot mapping information and synchronization signals (preamble) to beam mapping information besides providing the information on the synchronization slots to monitor and the synchronization signals to monitor.

Figure 12A:
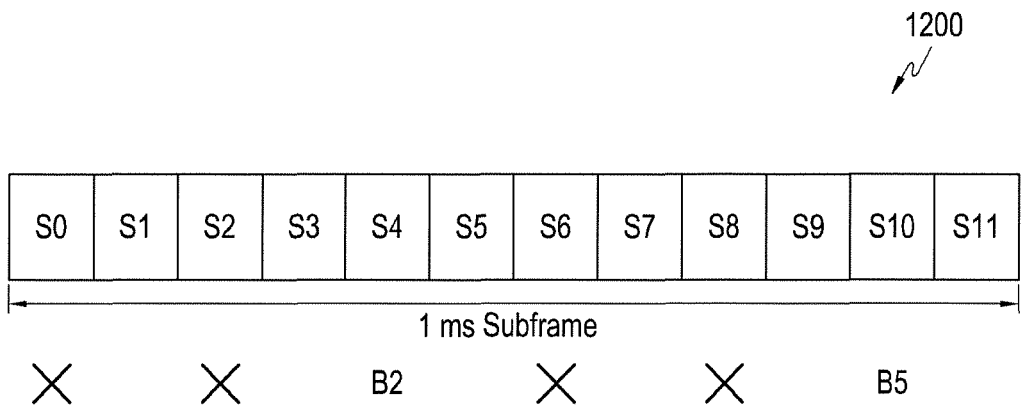
FIGS. 12A and 12C are schematic representations of selective beam transmission by 5G BS, according to an embodiment of the present disclosure.
Figure 12B:
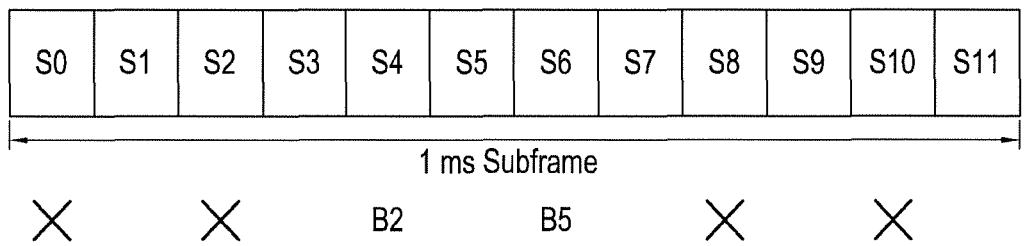
Figure 12C:
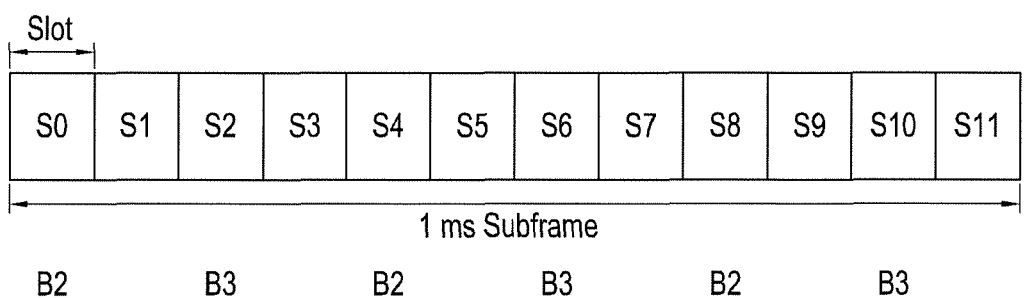

FIGS. 12A and 12C are schematic representations of selective beam transmission by 5G BS, according to an embodiment of the present disclosure. In one embodiment of the present disclosure, selective transmission of the beams by 5G BS 106 is described wherein a 5G BS 106 selectively transmits the beams as per the location of MSs 102 that are connected to it, if the locations of the MSs 102 are known to the 5G BS 106 at its sector level. The 4G BS 104 can indicate the location of the MS 102 to the 5G BS 106 if the location of the MS 102 is known to the 4G BS 104. The 5G BS 106 sends the synchronization signal only in the slots in which the beam IDs corresponding to that 5G sector are mapped. This is illustrated in FIG. 12A. This helps in the energy savings of the 5G BS 106. Further, the beam mapping can be changed such that the required beams are on subsequent synchronization slots. This is illustrated in FIG. 12B. In another embodiment, if there are no other MSs 102 in other sectors of the 5G BS 106, then the 5G BS 106 can use the slots corresponding to the other sectors for (re)transmission of synchronization signal in the sector in which the MS(s) 102 is present. This is illustrated in FIG. 12C. When all the MSs 102 in a sector have left the 5G BS 106, the 5G BS 106 can switch off the transmission of the control beams corresponding to that sector. In one extreme of this embodiment if the location of the MS 102 is known to the 5G BS 106 at a beam level then the 5G BS 106 switches on only the beam that corresponds to the MS 102 location.

Figure 13A:
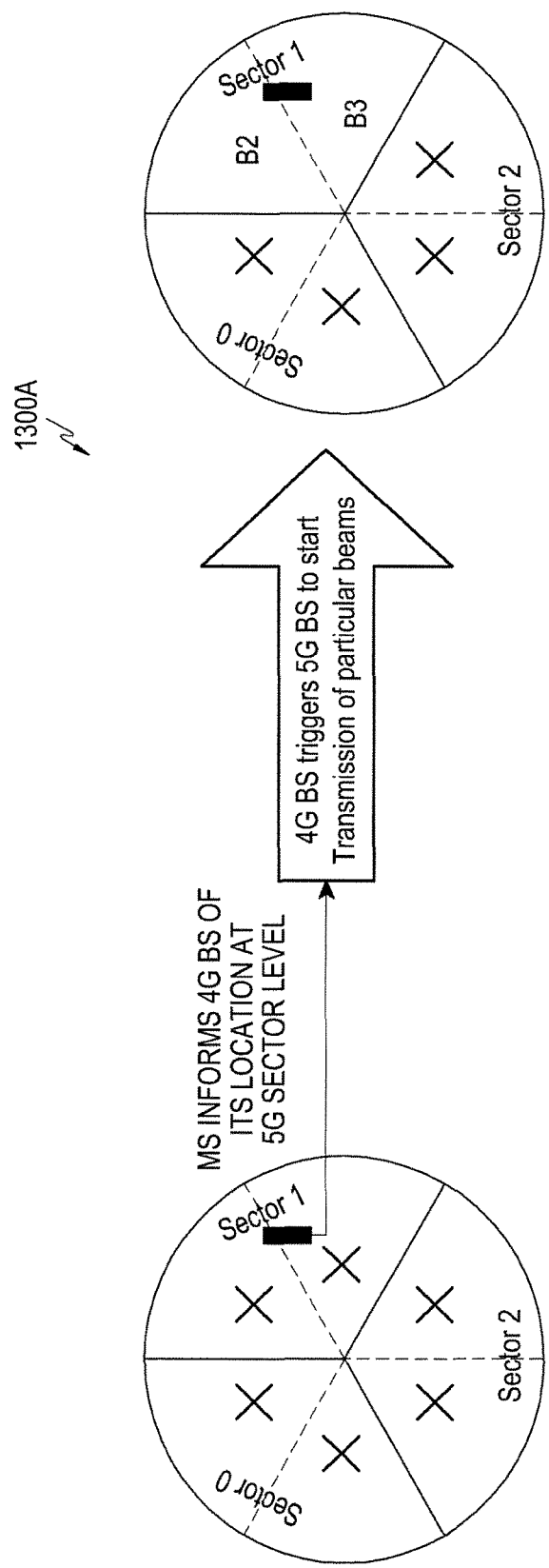
FIG. 13A is a schematic representation of 4G BS triggered selective beam transmission by 5G BS, according to an embodiment of the present disclosure.
Figure 13B:
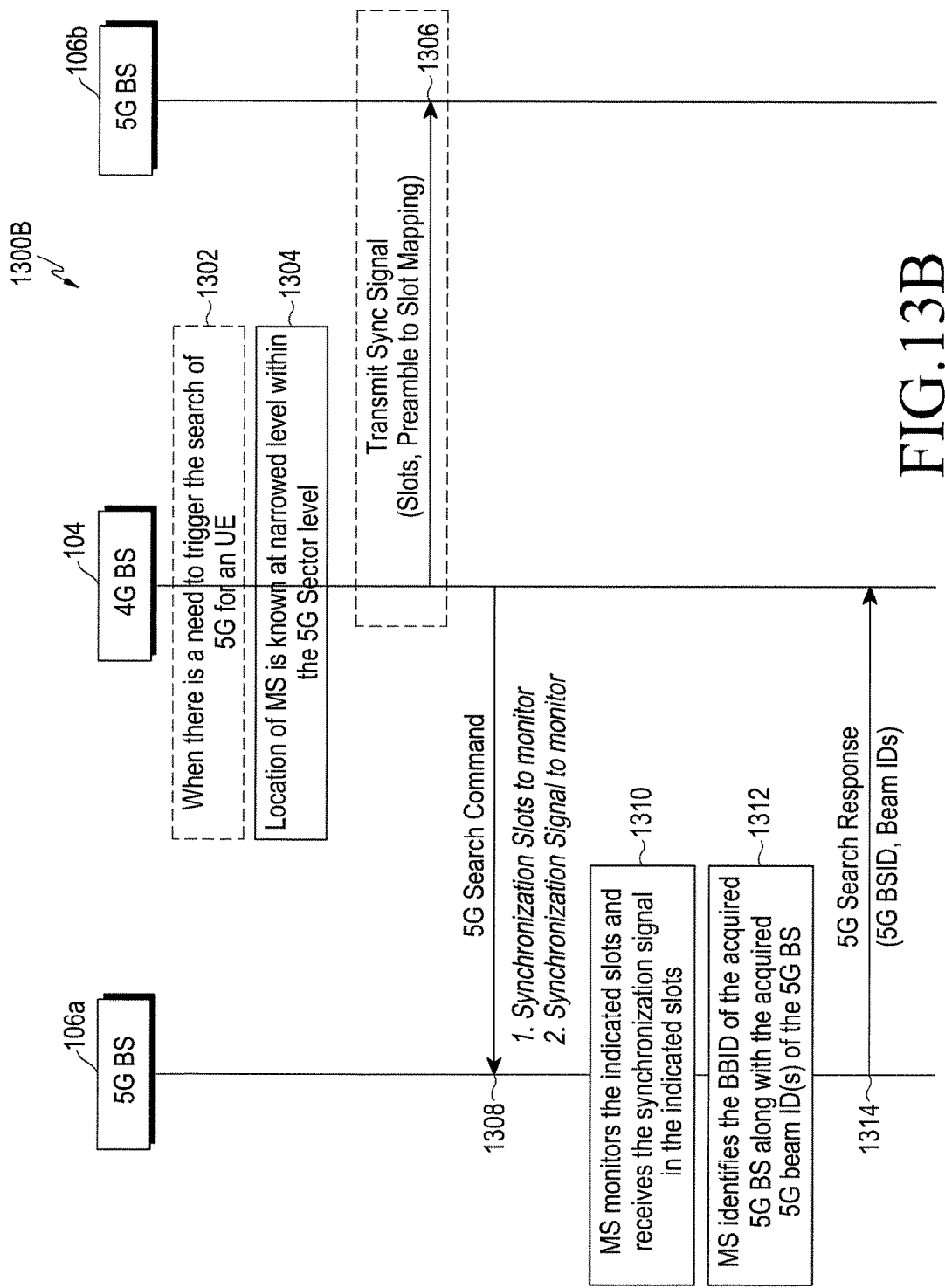
FIG. 13B is an exemplary flowchart illustrating a method of 4G BS triggered selective beam transmission by 5G BS, according to an embodiment of the present disclosure.

FIG. 13A is a schematic representation of 4G BS triggered selective beam transmission by 5G BS and FIG. 13B is an exemplary flowchart illustrating a method of 4G BS triggered selective beam transmission by 5G BS, according to an embodiment of the present disclosure. In an embodiment of the present disclosure, a 5G BS 106 does not transmit any control channel including the synchronization signal unless instructed by an associated 4G BS 104. When an MS 102 wants to search for 5G cells it informs the 4G BS 104 or when the 4G BS 104 decides to triggers the MS 102 to search for 5G cells, it selects the 5G BSs 106 which can be probable candidates for the MS 102 based on the location of the MS 102 and then triggers the selected 5G BSs 106 to transmit synchronization signal in specific slots as per the location of the MS 102. This is further illustrated in FIGS. 13A and 13B. For example, if the location of MS 102 indicates that it is in the region of Sector 1 of 5G BS P1, the 4G BS 104 triggers the BS P1 to start the transmission of synchronization signal in the beams corresponding to sector 1 (Beams B2 & B3 in the example). This is helpful in saving the energy of the 5G BS 106 and it also helps in reduction of interference which is caused by unnecessary transmission of synchronization signal. However if the location of MS 102 is not known at the granularity of 5G sector, the 4G BS 104 can trigger the selected 5G BS(s) 106 for transmission of sync signal in all the synchronization slots.

Figure 14:
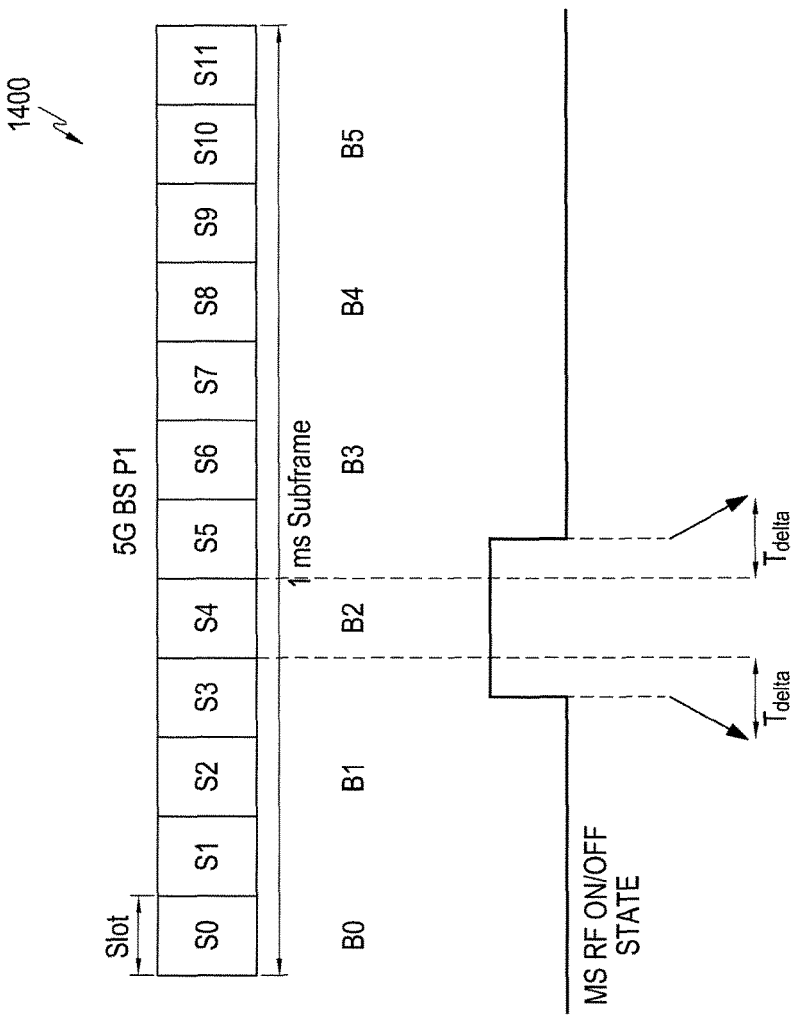
FIG. 14 is a schematic representation of time alignment of 4G and 5G BS, according to an embodiment of the present disclosure.

FIG. 14 is a schematic representation of time alignment of 4G and 5G BS, according to an embodiment of the present disclosure. In an embodiment of the present disclosure, the time synchronization of the 4G BS 104 and the 5G BSs 106 is described wherein, the 4G BS 104 and the 5G BS 106 are time aligned in the start of their frame timing and the start of the synchronization signal in the corresponding 5G BS 106 can be indicated using an offset with respect to the timing of the 4G BS 104. For receiving a 5G slot, the MS 102 needs to open a window that includes at least twice the difference in the propagation delay between the MS 102 and the 4G BS 104 and the MS 102 and the 5G BS 106 besides the 5G slot duration. This difference in the propagation delay can be fixed in the system. This is illustrated in FIG. 14. In another embodiment of the disclosure, the start of the frame of the 5G BS 106 is time aligned to the reception of the start of the 4G frame timing by the 5G BS 106. In such a case the start of the synchronization signal in the corresponding 5G BS 106 can be indicated using an offset with respect to the timing of the 4G BS 104. For receiving a 5G slot, the MS 102 needs to open a window that includes at least the 5G slot duration. The time alignment method (as explained here) between the start of the 4G BS 104 and the 5G BS 106 can be fixed in the system. Alternatively it can be broadcasted by the 4G BS 104.

The present embodiments have been described with reference to specific example embodiments. It will be evident that various modifications and changes may be made to these embodiments without departing from the broader spirit and scope of the various embodiments. Furthermore, the various devices, modules, and the like described herein may be enabled and operated using hardware circuitry, firmware, and/or software embodied in a machine readable medium.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of enabling cell acquisition in a wireless communication, the method comprising:
   determining, by a first base station, a mobile station (MS) located in a cell sector using at least one first frequency carrier;
   identifying, by the first base station, at least one second base station using at least one second frequency carrier within the cell sector; and
   transmitting, by the first base station, a search command for the at least one second base station to the MS,
   wherein the first base station enables the MS to search for the at least one second based station by providing a predefined number of synchronization slots to be monitored based on location information of the MS.

2. The method of claim 1, wherein a search command defines one or more parameters for identifying the at least one second base station.

3. The method of claim 2, wherein the one or more parameters defined in the search command comprises:
   a plurality of synchronization slots associated with the at least one second base station; and
   a plurality of synchronization signals transmitted in the plurality of synchronization slots.

4. The method of claim 2, wherein the one or more parameters defined in the search command correspond to the at least one second base station present within the cell sector of the first base station.

5. The method of claim 2, wherein the one or more parameters defined in the search command correspond to a subset of the at least one second base station located within the cell sector of the first base station, wherein the subset of the at least one second base station is determined based on the location information of the MS.

6. The method of claim 1, further comprising:
   receiving a search response in response to the search command from the MS,
   wherein the search response comprises a base station identification number (BSID) of the at least one second base station and one or more identified beam identities associated with the at least one second base station.

7. The method of claim 1, further comprising:
   determining, by the MS, one or more synchronization slots to be monitored with respect to a frame timing of the first base station;
   receiving a synchronization signal from the one or more synchronization slots; and
   identifying a base station identification number (BSID) of at least one of the at least one second base station along with one or more identified beam identities associated with the at least one of the at least one second base station.

8. The method of claim 1, wherein the at least one first frequency carrier is a lower frequency and the at least one second frequency carrier is a higher frequency.

9. A method of enabling cell acquisition in a wireless communication, the method comprising:
   receiving, by a mobile station (MS), information of one or more second base stations broadcasted from a first base station for each of a first frequency carrier cell sector level;
   initiating, by the MS, search of the one or more second base stations;
   determining, by the MS, one or more synchronization slots associated with the one or more second base stations;
   monitoring, by the MS, the determined one or more synchronization slots based on the first frequency carrier cell sector level; and
   receiving, by the MS, one or more synchronization signals in the determined one or more synchronization slots.

10. The method of claim 9, further comprising:
    receiving, by the MS, a search command for the one or more second base stations from the first base station; and
    identifying, by the MS, the one or more second base stations based on one or more parameters defined in the search command.

11. The method of claim 9, further comprising:
    transmitting, by the MS, a search response in response to a search command to the first base station,
    wherein the search response comprises a base station identification number (BSID) of at least one of the one or more second base stations and one or more identified beam identities associated with the at least one of the one or more second base stations.

12. The method of claim 9, wherein the information of one or more second base stations comprises at least one of the synchronization slots to monitor and the synchronization signals to monitor for one or more second base stations in each first frequency carrier cell sector level.

13. The method of claim 9, wherein the first base station is a lower frequency cell and the one or more second base stations is a higher frequency cell.

14. A first base station for enabling cell acquisition in a wireless communication, the first base station comprising:
controller configured to determine a mobile station (MS) located in a cell sector using at least one first frequency carrier, and identify at least one second base station using at least one second frequency carrier within the cell sector; and
transceiver configured to transmit a search command for the at least one second base station to the MS,
wherein the first base station enables the MS to search for the at least one second base station by providing a predefined number of synchronization slots to be monitored based on location information of the MS.

15. The first base station of claim 14, wherein the search command defines one or more parameters for identifying the at least one second base station.

16. The first base station of claim 15, wherein the one or more parameters defined in the search command comprises:
a plurality of synchronization slots associated with the at least one second base station; and
a plurality of synchronization signals transmitted in the plurality of synchronization slots.

17. The first base station of claim 15, wherein the one or more parameters defined in the search command correspond to the at least one second base station present within the cell sector of the first base station.

18. The first base station of claim 15, wherein the one or more parameters defined in the search command correspond to a subset of the at least one second base station present within the cell sector of the first base station, wherein the subset of the at least one second base station is determined based on the location information of the MS.

19. The first base station of claim 14, wherein the transceiver receives a search response in response to the search command from the MS,
wherein the search response comprises a base station identification number (BSID) of at least one of the at least one second base station and one or more identified beam identities associated with the at least one of the at least one second base station.

20. The first base station of claim 14, wherein the at least one first frequency carrier is a low frequency and the at least one second frequency carrier is a high frequency.

21. A mobile station (MS) for enabling cell acquisition in a wireless communication, the MS comprising:
transceiver configured to receive information of one or more second base stations broadcasted from a first base station for a first frequency carrier cell sector level and receive one or more synchronization signals in one or more synchronization slots; and
controller configured to initiate search of the one or more second base stations, determine the one or more synchronization slots associated with the one or more second base stations, and monitor the determined one or more synchronization slots based on the first frequency carrier cell sector level.

22. The MS of claim 21, wherein the transceiver receives a search command for the one or more second base stations from the first base station, and identifies the one or more second base stations based on one or more parameters defined in the search command.

23. The MS of claim 21, wherein the transceiver transmits a search response in response to a search command to the first base station,
wherein the search response comprises a base station identification number (BSID) of at least one of the one or more second base stations and one or more identified beam identities associated with the at least one of the one or more second base stations.

24. The MS of claim 21, wherein the information of one or more second base stations comprises at least one of the synchronization slots to monitor and the synchronization signals to monitor for one or more second base stations in the first frequency carrier cell sector level.

25. The MS of claim 21, wherein the first base station is a low frequency cell and the one or more second base stations are a high frequency cell.

* * * * *